Oct. 25, 1960 R. W. PEARSON 2,957,975
METHOD AND APPARATUS FOR MAINTAINING WELDING
ELECTRODE WHEELS AND THE LIKE
Filed July 28, 1958
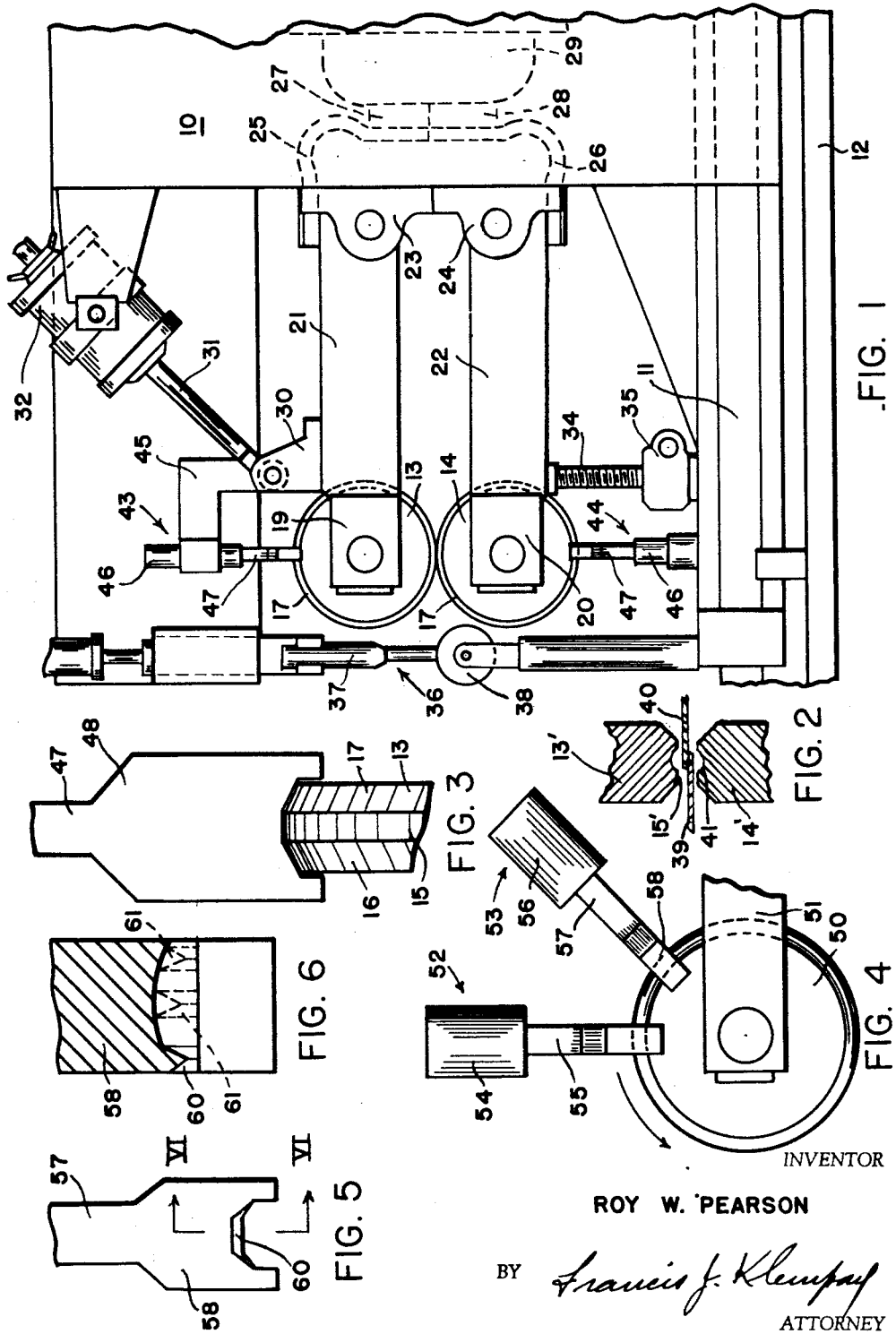
INVENTOR
ROY W. PEARSON
BY Francis J. Klempay
ATTORNEY United States Patent Office 2,957,975
Patented Oct. 25, 1960

2,957,975

METHOD AND APPARATUS FOR MAINTAINING WELDING ELECTRODE WHEELS AND THE LIKE

Roy W. Pearson, Warren, Ohio, assignor to The Taylor-Winfield Corporation, Warren, Ohio, a corporation of Ohio Filed July 28, 1958, Ser. No. 751,547

13 Claims. (Cl. 219—81)

This invention relates generally to the welding art and more particularly to methods and apparatus for maintaining welding electrode wheels and the like.

As will be understood, it is usual practice in this art to provide a welder embodying a pair of large circular welding electrode wheels for welding the seam between the adjacent ends of metal strip sections, plates and other like workpieces. Suitable mechanical and electrical equipment is incorporated in such a welder to support the welding electrode wheels for rolling movement under pressure across the seam of the workpieces to be welded and to supply high amperage-low voltage welding current thereto. The welding electrode wheels are, of course, current conductive and to provide the requisite electrical characteristics are usually manufactured from copper or other relatively soft highly current conductive material. Although the use of such welding electrode wheels satisfies the electrical requirements of a welder, several serious and troublesome mechanical problems are encountered which effect the quality and acceptability of the resultant welds and the life of the welding electrode wheels.

Since the welding electrode wheels are manufactured from relatively soft material and are subject to heating due to the high amperage currents conducted thereby during welding operations, the workpiece engaging peripheral edges of the welding electrode wheels are deformed and pitted due to the edges of the relatively hard workpieces digging into the contacting outer peripheral edges of the welding electrode wheels. As for example, in mash seam welding operation wherein the workpieces are slightly overlapped and are traversed by opposed welding electrode wheels under high pressure to weld and mash down the overlapped workpieces, the sharp edges of the workpieces cause a distinct groove to be formed on the edges of the welding electrode wheels. This, of course, is highly undesirable since the grooved welding electrode wheels do not provide sufficient electrical contact areas where they are most needed thereby resulting in unacceptable welds and overheating of the electrode wheels which causes further deterioration of the same. In addition to the above, another serious problem in maintaining the welding electrode wheels is encountered when coated workpieces, such as galvanized or terneplate strip sections, for example, are welded. The electrode wheels become coated with a hard crust of the coating material used on the workpieces which adversely affects the electrical characteristics of the welder and which must be broken from the welding electrode wheels if successful welding operations are to be carried out.

The above problems have, of course, long been recognized in the art and many suggestions have been advanced over the years in attempting to mitigate or eliminate the same. However, these suggestions have not been completely effective in maintaining the welding electrode wheels as will be discussed below. Perhaps the most widely accepted method of maintaining the welding electrode wheels is the use of small knurled wheels which engage the outer periphery of the electrode wheels. The knurled wheels do maintain the shape of the welding electrode wheels but are objectionable in that the pattern of the knurls is cut into the edges of the welding electrode wheels and this pattern is in turn imprinted on the surfaces of the workpieces being welded. Further, when knurled wheels or tools are used to break the coating from the welding electrode wheels the spaces between the knurls or serrations tend to fill up and become clogged thereby causing the knurled wheels or tools to lose their effectiveness and necessitating frequent and time consuming cleaning of the same. Another suggestion advanced in the prior art which is widely practiced is the use of trimming knives or tools wherein the electrode wheels are dressed by taking a thin cut from the edges of the wheels. This is usually a manual operation and in most cases is time consuming and difficult to perform. Further, the use of trimming knives or tools adversely affects the usable life of the welding electrode wheels since an actual cut of the material is taken from the edges of the electrode wheels.

In view of the above, it is the primary or ultimate object of the present invention to provide improved methods and apparatus for maintaining the shape of welding electrode wheels. In connection with this object of the invention the apparatus disclosed herein comprises peening means which impact the peripheral edges of the welding electrode wheels under considerable force to maintain the same in their desired shape.

A further object of the invention is to provide improved methods and apparatus for breaking the accumulated coatings from the welding electrode wheels.

Another object of the invention is to provide methods and apparatus for maintaining welding electrode wheels wherein the life of the electrode wheels is substantially increased. The use of peening means and the constant impacting of the edges of the welding electrode wheels work hardens these edges thereby greatly reducing the formation of grooves, pits, etc. therein and substantially increasing the usable life of the welding electrode wheels.

Yet another object of the invention is to provide methods and apparatus for maintaining welding electrode wheels wherein neither the welding electrode wheels nor the surfaces of the workpieces being welded are imprinted with an objectionable pattern.

Still another object of the invention is to provide methods and apparatus for breaking the accumulated coatings from the welding electrode wheels wherein the apparatus cannot become clogged and therefore does not necessitate frequent cleaning.

A further important object of the invention is to provide methods and apparatus of the character described wherein the shaping ability and the ability to break away the coatings on the welding electrode wheels can be easily and readily controlled.

Another object of the invention is to provide methods and apparatus for maintaining welding wheel electrodes wherein the methods are characterized by their extreme simplicity of operation and the apparatus is characterized by its low cost and simplicity of construction.

The above, as well as other objects and advantages of the invention, will become more readily apparent upon consideration of the following detailed specification and accompanying drawing wherein there are disclosed several representative embodiments of the present invention.

In the drawing:

Figure 1 is fragmentary side view of a seam welder embodying apparatus and employing the methods for maintaining welding electrode wheels of the present invention;

Figure 2 is a fragmentary end sectional view showing the groove formed in the opposed welding electrode wheels when apparatus for maintaining the shape thereof is not employed;

Figure 3 is an enlarged fragmentary end view showing specifically the engagement between the upper welding electrode and peening tool employed in the welder shown in Figure 1;

Figure 4 is a side view showing a welding electrode wheel and apparatus for maintaining the shape thereof and removing the coating therefrom constructed in accordance with the teachings of the present invention;

Figure 5 is an end view of one of the peening tools used in the apparatus shown in Figure 4 for removing the coating from the welding electrode wheel; and Figure 6 is a side sectional view taken along the section line VI—VI of Figure 5.

Referring now to the drawing, and initially to Figure 1 thereof, there is shown a representative seam welder embodying methods and apparatus for maintaining welding electrode wheels in accordance with the teachings of the present invention. The welder comprises a generally U-shaped carriage 10 which is open at its forward end and is mounted for sliding movement on a pair of longitudinally extending guide rods 11 which are supported at their opposite ends on a base 12. The welding carriage mounts welding means which comprises a pair of opposed current conductive welding electrode wheels 13 and 14 which are circular and disc shaped with the outer peripheral edge surfaces thereof having a flat edge portion 15 and a pair of downwardly beveled edge portions 16 and 17 positioned on opposite sides of the flat edge portion 15 in the manner shown. The upper and lower welding electrode wheels 13 and 14 are journaled for rotation in suitable journal brackets 19 and 20 which are carried at the forward ends of the upper and lower spaced parallel current conductive arms 21 and 22. The rear ends of the spaced parallel current conductive arms are pivotally received in the mounting clevises 23 and 24 which are connected by suitable heavy conductors 25 and 26 to secondary terminals 27 and 28 of welding transformer 29 which is mounted within the carriage 10. The arrangement is such that high amperage welding currents will flow in series relation through the upper and lower current conductive arms 21 and 22, journal brackets 19 and 20, welding electrode wheels 13 and 14 and the workpieces disposed between the welding electrode wheels, not shown.

The upper current conductive arm 21 is formed with a clevis 30 on the top surface thereof which pivotally receives the piston rod 31 of a fluid welding ram cylinder 32 mounted on the carriage 10. The welding ram cylinder 32 is adapted to pivot the upper welding electrode wheel 13 away from the lower electrode wheel 14 so that the welder can be moved across the workpieces without welding the same and to apply the necessary pressure for effecting the welding of the workpieces. In mash type of welding operations, for which the illustrated welder is particularly well adapted, the welding ram cylinder 32 supplies sufficient force to reduce the thickness of the weld to less than the aggregate thickness of the overlapped workpieces. The lower current conducting arm 22 is supported by a threaded rod 34 which is adjustably received within a fitting 35 in the manner shown. The arrangement is such that the vertical position of the lower welding electrode wheel 14 is adjustable so that it is always disposed in tangential relation with respect to the bottom surfaces of the workpieces as is required.

Positioned forwardly of the welding electrode wheels 13 and 14 and mounted within the carriage 10 is a peening assembly designated by the reference numeral 36 which generally comprises a reciprocating peening tool 37 and a peening anvil roller 38. The peening assembly is used to reduce the thickness of the weld between the workpieces by subjecting the same to a continuous progressive impacting under considerable force. Such a peening assembly and the method of operating the same are the subject of my co-pending patent application Serial No. 743,118, filed June 19, 1958, entitled "Method and Apparatus for Welding Strip" and which is assigned to the assignee of the present invention.

As indicated above, the welding electrode wheels are fabricated from relatively soft current conductive materials and due to the heating and softening effect of the high amperage currents passing therethrough, the heavy pressures applied thereto during welding and the relative hardness of the workpieces being welded the peripheral edges of the welding electrode wheels are subjected to deterioration and deformation unless means are incorporated for properly maintaining the wheels. This is illustrated in Figure 2 of the drawing where the electrode wheels 13' and 14' are shown in cooperating relation with a pair of overlapped workpieces 39 and 40. Note that the flat edge portions 15' of these electrode wheels have a distinct semicircular groove 41 formed therein due to the edges of the workpieces digging into the flat peripheral edge portions 15' of the welding electrode wheels during successive welding operations.

To prevent and mitigate such deterioration and deformation of the welding electrode wheels 13 and 14 peening shaping assemblies generally designated by the reference numerals 43 and 44 are provided. The peening shaping assembly 43 for the upper welding electrode wheel 13 is mounted from an L-shaped bracket 45 extending from the carriage 10 while the peening shaping assembly 44 for the lower welding electrode wheel 14 is mounted directly on the lower arm of the carriage 10. Each of the peening shaping assemblies comprises a peening cylinder 46 which, upon the proper valving of fluid thereto, is adapted to very rapidly reciprocate a peening tool 47. Each of the peening tools 47 is generally rod-like and has an enlarged Y-shaped portion 48 which is shaped and contoured to nest with and to complementarily receive the edge of the welding electrode wheel associated therewith. The Y-shaped end portion of each of the peening tools is contoured to the exact shape of the welding electrode wheel as is clearly shown in Figure 3 of the drawing.

In operation of the apparatus thus far described, the welding electrodes move across the workpieces to weld the same. At this time the peening cylinders 46 are actuated to reciprocate the peening tools thereby subjecting the edges of the welding electrode wheels to a constant progressive impacting under considerable force. This not only shapes the welding electrode wheels and removes all deformations therein but also the constant impacting under considerable force work hardens the peripheral edges of the welding electrode wheels and this tends to prevent a groove or other like distortion from forming therein. It will also be noted that the contacting surfaces of the peening tools are smooth and therefore they do not imprint any pattern on the welding electrode wheels as is the case with knurling wheels and tools used in the prior art. Also, the work hardening of the edges of the welding electrode wheels due to the progressive impacting thereof substantially increases their useful life, especially when compared with methods wherein a thin cut is taken from the edges of the welding electrode wheels to maintain the same.

As set forth above, additional problems are encountered when coated workpieces are welded due to the formation of a crust or coating material on the peripheral edges of the welding electrode wheels and it is necessary to remove such coatings if successful welding operations are to be completed. In Figures 4–6 of the drawing there is shown apparatus for effecting such a result in an improved manner which will now be described.

In Figure 4 of the drawing there is shown a welding electrode wheel 50 which is journaled at the end of a current conductive arm 51. The welding electrode wheel shown has same cross sectional shape as the electrode wheels 13 and 14 above described. Supported adjacent the welding electrode wheel 50 by suitable mounting means, not shown, is a peening shaping assembly 52 and a peening breaking assembly 53. The peening shaping assembly 52 is exactly the same as the peening shaping assemblies 43 and 44 and comprises a peening cylinder 54 and a peening tool 55 which has an accurately and smoothly contoured inner surface adapted to engage and progressively impact against the welding electrode wheel 50 for shaping the same. The peening breaking assembly 53 is positioned rearwardly of the peening shaping assembly 51 with respect to the direction of rotation of the welding electrode wheel 50 which is represented by the arrow. The peening breaking assembly comprises a peening cylinder 56 which is adapted to reciprocate a peening tool 57 having a Y-shaped end portion 58. The Y-shaped end portion 58 of the peening tool has the inner surface thereof contoured to the general shape of the edge of the welding electrode wheel 50 in the manner shown and has formed at the forward edge thereof a sharp V-shaped projection or knife 60 which follows the contour of the edge of the welding electrode wheel and is adapted to break the coating therefrom. Although only the upper welding electrode wheel is shown in Figure 4 it should be understood that a cooperating lower electrode wheel and the associated peening breaking and peening shaping assemblies would be provided. In the operation of this apparatus both of the peening cylinders are actuated to reciprocate their respective peening tools against the edge of the welding electrode wheel as the same rolls across the workpieces. The sharp projection or knife 60 breaks away the coating from the electrode welding wheel while the smooth inner surface of the reciprocating tool 55 erases any marks left by the impacting of knife 60 against the peripheral wheel edge and properly shapes and work hardens this edge. If desired, the Y-shaped end portion of the peening tool 58 can be provided with a series of projections or knives as represented by the broken lines at 61 in Figure 6 of the drawing. The only requirement in this latter type of installation is that the knives or projections be spaced a sufficient distance from each other to prevent the clogging of the spaces therebetween by the coating material. It will be noted that this apparatus for maintaining the welding electrode wheels allows the breaking of the coatings to be carried out in a continuous and automatic manner without the necessity of frequent cleaning which has characterized prior art apparatus. Also, the welding electrode wheels are properly shaped and work hardened without imprinting any pattern on the same or the workpieces.

It is also within the purview of the present invention to combine the peening breaking assembly and the peening shaping assembly into one assembly. This can be accomplished by providing a single peening tool and actuating cylinder therefor which has the forward portion (in the direction of electrode wheel rotation) of its inner surface smoothly contoured to engage the edge of the welding electrode wheel while the rear portion is formed with a series of projections or knives. The operation and advantages of this type of assembly are the same as those set forth in relation to the apparatus shown in Figure 4 of the drawing.

One of the important advantages of the apparatus disclosed for maintaining welding electrode wheels or the like is that the impacting or contouring ability is readily and easily controlled. To increase or decrease the impacting or contouring ability it is only necessary to change the pressure of the fluid supplied to the fluid peening cylinders. Of course, the invention, in its broader aspects, is not limited to the specific peening assemblies shown as obviously other types of peening apparatus may be employed. As for example, the fluid peening cylinders might be replaced with electro-mechanical solenoids of sufficient capacity if desired. The inventive concept of the present invention is the disclosure of methods and apparatus for maintaining welding electrode wheels and the like wherein the welding electrode wheels are subjected to a constant progressive impacting under considerable force to properly shape and/or break up the coating material on the welding electrode wheels. The teachings of the invention are not specifically limited to welding electrode wheels as the basic principles thereof can be applied in maintaining other types of electrodes as will be apparent to those skilled in the art.

Another important advantage of the methods and apparatus disclosed herein for maintaining welding electrode wheels and the like is that they are characterized by their utmost simplicity in construction and operation. It will be noted that the peening assemblies are rather small and are easily mounted whereby present welders can be equipped with such assemblies without extensive modifications and at a minimum of cost.

Although I have accomplished the object initially set forth by providing improved methods and apparatus for maintaining welding electrode wheels and the like, it should be understood that many changes may be made in the illustrated embodiments disclosed herein without departing from the clear teachings of the invention. Accordingly, reference should be had to the following appended claims in determining the true scope of the invention.

I claim:

1. The method of maintaining a welding electrode wheel during welding operations which comprises the step of subjecting the periphery of said welding electrode wheel to a progressive impacting and hammering under considerable force at a point removed from the point of weld as said welding electrode wheel rolls across said workpieces to weld the same.

2. The method of maintaining a welding electrode wheel of the type adapted to roll across workpieces to weld the same without imprinting a pattern on the peripheral edge of said welding electrode wheel which comprises the step of subjecting said peripheral edge of said welding electrode wheel to a progressive impacting and hammering under considerable force at a point removed from the point of contact between said welding electrode wheel and said workpieces as said welding electrode wheel rolls across said workpieces by reciprocating tool means having an accurately contoured smooth surface portion complementary to said peripheral edge of said welding electrode wheel to maintain the shape of said welding electrode wheel and to prevent the deterioration and deformation thereof.

3. The method according to claim 2 which further comprises the step of subjecting said peripheral edge of said welding electrode wheel to a progressive impacting and hammering under considerable force by reciprocating tool means having knife means complementary to said peripheral edge of said welding electrode wheel to break up coatings thereon as said welding electrode wheel rolls across said workpieces.

4. The method of maintaining a welding electrode wheel of the type adapted to roll across workpieces to weld the same which comprises the step of subjecting the peripheral edge of said welding electrode wheel to a progressive impacting hammering under considerable force as the same rolls across said workpieces by reciprocating tool means having knife means complementary to said peripheral edge of said welding electrode wheel to break up accumulated coatings thereon.

5. The method of maintaining a welding electrode adapted to move across and to weld coated workpieces which comprises the steps of subjecting said electrode to progressive impacting and hammering under considerable force by reciprocating knife means to break up accumulated coatings on said electrode as the same moves across said workpieces, and subjecting said electrode to progressive impacting and hammering under considerable force by reciprocating hammer means to eliminate any marks left on said electrode by said reciprocating knife means and to shape said electrode as the same moves across said workpieces.

6. Apparatus for maintaining a welding electrode wheel of the type adapted to roll across workpieces to weld the same which comprises a peening tool, said peening tool having an end portion complementary to and adapted to engage the peripheral edge of said welding electrode wheel, and means to reciprocate said tool under considerable force as said welding electrode wheel rolls across said workpieces to subject said welding electrode wheel to a progressive impacting and hammering thereby maintaining said welding electrode wheel.

7. Apparatus according to claim 6 further characterized in that said end portion of said peening tool comprises a sharp projection adapted to engage said peripheral edge of said welding electrode wheel for breaking up coatings thereon.

8. Apparatus according to claim 6 further characterized in that said end of said peening tool portion comprises a sharp projection adapted to engage said peripheral edge of said welding electrode wheel for breaking up coating thereon, said end portion further comprising a smooth accurately contoured surface adapted to engage said peripheral edge of said welding electrode wheel for shaping and erasing any marks left on said peripheral edge of said welding electrode wheel by said sharp projection, and said sharp projection being disposed forwardly of said smooth surface with respect to the direction of rotation of said welding electrode wheel.

9. Apparatus for maintaining a welding electrode wheel of the type adapted to roll across workpieces to weld the same which comprises a first peening tool, said first peening tool having an end portion with a sharp projection adapted to engage the peripheral edge of said welding electrode wheel, a second peening tool, said second peening tool having a smooth accurately contoured end portion adapted to engage said peripheral edge of said welding electrode wheel, means to reciprocate said first and said second peening tools under considerable force to subject said peripheral edge of said welding electrode wheel to progressive impacting and hammering by said first and said second peening tools as said welding electrode wheel rolls across said workpieces, and said first peening tool being disposed forwardly of said second peening tool with respect to the direction of rotation of said welding electrode wheel.

10. The method of maintaining a welding electrode wheel of the type adapted to roll across workpieces to weld the same which comprises the step of subjecting the peripheral edge of said welding electrode wheel to a progressive impacting and hammering under considerable force sufficient to maintain said welding electrode wheel as said welding electrode wheel rolls across said workpieces at a point removed from the point of contact between said welding electrode wheel and said workpieces.

11. The method of breaking accumulated coatings from a welding electrode wheel during welding operations which comprises the steps of subjecting the periphery of said welding electrode wheel to a progressive impacting and hammering under considerable force by knife means at a point removed from the point of weld as said electrode wheel rolls across said workpieces.

12. The method of maintaining a welding electrode wheel of the type adapted to roll across workpieces to weld the same which comprises the step of subjecting the peripheral edge portions of said welding electrode wheel to a progressive impacting and hammering by reciprocating tool means as the same rolls across said workpieces.

13. Apparatus for maintaining a welding electrode wheel of the type adapted to roll across workpieces to weld the same which comprises a tool means, said tool means having a portion complementary to and adapted to engage the peripheral edge of said welding electrode wheel, and means to reciprocate said tool means as said welding electrode wheel rolls across said workpieces to subject said welding electrode wheel to a progressive impacting and hammering thereby maintaining said welding electrode wheel.

References Cited in the file of this patent

UNITED STATES PATENTS

| 1,585,740 | Saulia | May 25, 1926 |
| 1,822,371 | Pioch et al. | Sept. 8, 1931 |
| 1,862,108 | Brueckner | June 7, 1932 |
| 2,065,511 | Black | Dec. 29, 1936 |
| 2,250,645 | Meadowcroft et al. | July 29, 1941 |
| 2,337,037 | Fentress | Dec. 21, 1943 |
| 2,503,288 | Moore | Apr. 11, 1950 |

FOREIGN PATENTS

| 313,530 | Great Britain | 1931 |

(Complete not accepted. Printed for His Majesty's Stationary Office.)